(12) United States Patent
Hirata (10) Patent No.: US 11,958,132 B2
(45) Date of Patent: Apr. 16, 2024

(54) SiC INGOT PROCESSING METHOD AND LASER PROCESSING APPARATUS (71) Applicant: DISCO CORPORATION, Tokyo (JP)

(72) Inventor: Kazuya Hirata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 645 days.

(21) Appl. No.: 17/126,395

(22) Filed: Dec. 18, 2020

(65) Prior Publication Data
US 2021/0197319 A1 Jul. 1, 2021

(30) Foreign Application Priority Data

Dec. 26, 2019 (JP) .................................. 2019-235949

(51) Int. Cl.
| | | |
|---|---|---|
| B23K 26/352 | (2014.01) | |
| B23K 26/00 | (2014.01) | |
| B23K 103/00 | (2006.01) | |
| B24B 19/22 | (2006.01) | |
| B28D 5/00 | (2006.01) | |

(52) U.S. Cl.
CPC ........ B23K 26/352 (2015.10); B23K 26/0006 (2013.01); B24B 19/22 (2013.01); B28D 5/0011 (2013.01); B28D 5/0094 (2013.01); B23K 2103/50 (2018.08)

(58) Field of Classification Search
CPC .............. B23K 26/0006; B23K 26/352; B23K 2103/50; B24B 19/22; B28D 5/0011; B28D 5/0094
See application file for complete search history.

(56) References Cited

U.S. PATENT DOCUMENTS

| | | | | |
|---|---|---|---|---|
| 10,816,495 | B2 * | 10/2020 | Yungers | G01N 27/20 |
| 2006/0055504 | A1 * | 3/2006 | Pailthorp | B23K 26/361 |
| | | | | 338/195 |
| 2016/0163607 | A1 * | 6/2016 | Oh | H01L 22/14 |
| | | | | 324/762.01 |
| 2018/0354067 | A1 * | 12/2018 | Iizuka | H01L 29/1608 |
| 2019/0287814 | A1 * | 9/2019 | Supplieth | H01L 22/12 |

FOREIGN PATENT DOCUMENTS

| | | |
|---|---|---|
| JP | 2000094221 A | 4/2000 |
| JP | 2016111143 A | 6/2016 |

OTHER PUBLICATIONS

P.B. Nagy, Electric Resistance Measurement, 2016, ScienceDirect (Year: 2016).*

* cited by examiner

Primary Examiner — Nathaniel E Wiehe
Assistant Examiner — Spencer H. Kirkwood
(74) Attorney, Agent, or Firm — Greer Burns & Crain Ltd.

(57) ABSTRACT

A method of processing a SiC ingot includes a resistance value measuring step of measuring an electric resistance value of an end face of the SiC ingot, a laser beam output adjusting step of adjusting the output of a laser beam according to the electric resistance value measured in the resistance value measuring step, and a peeling belt forming step in which, while a laser beam of such a wavelength as to be transmitted through the SiC ingot is being applied to the SiC ingot with a focal point of the laser beam positioned at a depth corresponding to the thickness of a wafer to be formed, the SiC ingot and the focal point are put into relative processing feeding in an X-axis direction to form a belt-shaped peeling belt in the inside of the SiC ingot.

3 Claims, 6 Drawing Sheets

SiC INGOT PROCESSING METHOD AND LASER PROCESSING APPARATUS

BACKGROUND OF THE INVENTION

Field of the Invention

The present invention relates to a SiC ingot processing method and a laser processing apparatus.

Description of the Related Art

Devices such as integrated circuits (ICs), large-scale integrated circuits (LSIs), and light emitting diodes (LEDs) are formed by stacking a functional layer on a front surface of a wafer formed of silicon (Si), sapphire ($Al_2O_3$), or the like and partitioning the functional layer by a plurality of intersecting division line (streets). In addition, power devices, LEDs, and the like are formed by stacking a functional layer on a front surface of a wafer formed of silicon carbide (SiC) and partitioning the functional layer by a plurality of intersecting streets. The wafer formed with the devices is processed along the streets by a cutting apparatus or a laser processing apparatus to be divided into individual device chips, and the thus divided device chips are utilized for electric apparatuses such as mobile phones and personal computers.

The wafer formed with the devices is generally formed by thinly cutting a cylindrical ingot by a wire saw. A front surface and a back surface of the thus cut wafer are polished to be mirror surfaces (see, for example, Japanese Patent Laid-open No. 2000-94221). However, when the ingot is cut by a wire saw and the front surface and the back surface of the thus cut wafer are polished, most part (70% to 80%) of the ingot is discarded, which is uneconomical. Particularly, in the case of the SiC ingot, the ingot is quite hard, and it is difficult to cut the ingot by a wire saw. Accordingly, it takes a long time to cut the ingot, and productivity is low. In addition, the unit price of the ingot is high, and there is a problem of producing wafers efficiently.

In view of the foregoing circumstances, the present applicant has proposed a technology of applying a laser beam of such a wavelength as to be transmitted through SiC to a SiC ingot with a focal point of the laser beam positioned inside the SiC ingot to form a peeling belt at a planned cutting plane, and peeling the wafer from the SiC ingot along the planned cutting plane formed with the peeling belt (see, for example, Japanese Patent Laid-open No. 2016-111143).

SUMMARY OF THE INVENTION

The doping amount of nitrogen atoms (N) is controlled in the growth process of the SiC ingot, and the electric resistance value of the SiC ingot is set within an allowable range. However, the electric resistance value of the SiC ingot has variability even if it is within the allowable range. Thus, at the time of forming the peeling belt by applying a laser beam to the SiC ingot, there is a problem that a proper peeling belt cannot be formed due to the variability in the electric resistance value of the SiC ingot.

Accordingly, it is an object of the present invention to provide a SiC ingot processing method and a laser processing apparatus which make it possible to form a proper peeling belt in a SiC ingot.

In accordance with an aspect of the present invention, there is provided a method of processing a SiC ingot having an end face, the method including a resistance value measuring step of measuring an electric resistance value of the end face of the SiC ingot, a laser beam output adjusting step of adjusting the output of a laser beam according to the electric resistance value measured in the resistance value measuring step, a peeling belt forming step in which, in the case where a c-plane is inclined relative to the end face of the SiC ingot and in the case where a direction orthogonal to a direction in which an off angle is formed between the end face of the SiC ingot and the c-plane is set as an X-axis direction while a direction orthogonal to the X-axis direction is set as a Y-axis direction, while a laser beam of such a wavelength as to be transmitted through the SiC ingot is being applied to the SiC ingot with a focal point of the laser beam positioned at a depth corresponding to the thickness of a wafer to be formed, the SiC ingot and the focal point are put into relative processing feeding in the X-axis direction to form a belt-shaped peeling belt in which a crack extends along the c-plane from a part where SiC is separated into Si and carbon (C), and an indexing feeding step of putting the SiC ingot and the focal point into relative indexing feeding in the Y-axis direction to juxtapose the peeling belts in the Y-axis direction.

Preferably, a flat surface forming step of grinding the end face of the SiC ingot to form a flat surface is carried out before the peeling belt forming step.

In accordance with another aspect of the present invention, there is provided a laser processing apparatus that forms a peeling belt in a SiC ingot, the laser processing apparatus including a holding table that holds the SiC ingot, a laser beam applying unit that, in the case where a c-plane is inclined relative to an end face of the SiC ingot held by the holding table and in the case where a direction orthogonal to a direction in which an off angle is formed between the end face of the SiC ingot and the c-plane is set as an X-axis direction while a direction orthogonal to the X-axis direction is set as a Y-axis direction, includes a light condenser for applying a laser beam of such a wavelength as to be transmitted through the SiC ingot to the SiC ingot with a focal point of the laser beam positioned at a depth corresponding to the thickness of a wafer to be formed and forms a belt-shaped peeling belt in which a crack extends along the c-plane from a part where SiC is separated into Si and C, an X-axis feeding mechanism that puts the holding table and the light condenser into relative processing feeding in the X-axis direction, a Y-axis feeding mechanism that puts the holding table and the light condenser into relative indexing feeding in the Y-axis direction, and a resistance value measuring instrument that measures an electric resistance value of the end face of the SiC ingot.

Preferably, the laser processing apparatus includes a control unit that adjusts the output of the laser beam according to the electric resistance value measured by the resistance value measuring instrument.

According to the method of processing a SiC ingot of the present invention, a proper peeling belt can be formed in the SiC ingot.

According to the laser processing apparatus of the present invention, a proper peeling belt can be formed in the SiC ingot.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of a SiC ingot processing method and a laser processing apparatus of the present invention will be described below referring to the drawings. First, referring to FIG. 1, a preferred embodiment of the laser processing apparatus configured according to the present invention will be described. The laser processing apparatus denoted as a whole by a reference symbol 2 includes a holding unit 4 that holds a SiC ingot, and a light condenser 6 that applies a laser beam of such a wavelength as to be transmitted through the SiC ingot to the SiC ingot with a focal point of the laser beam positioned at a depth corresponding to the thickness of a wafer to be formed. Further, the laser processing apparatus 2 includes at least a laser beam applying unit 8 that forms a belt-shaped peeling belt in which a crack extends along a c-plane from a part where SiC is separated into Si and C, an X-axis feeding mechanism 10 that puts the holding unit 4 and the light condenser 6 into relative processing feeding in an X-axis direction, a Y-axis feeding mechanism 12 that puts the holding unit 4 and the light condenser 6 into relative indexing feeding in a Y-axis direction, and a resistance value measuring instrument 14 that measures the electric resistance value of an end face of the SiC ingot. The laser processing apparatus 2 in the present embodiment further includes a control unit 16 (see FIG. 2) that adjusts the output of the laser beam according to the electric resistance value measured by the resistance value measuring instrument 14. Note that the X-axis direction is a direction indicated by an arrow X in FIG. 1, and the Y-axis direction is a direction which is indicated by an arrow Y in FIG. 1 and which is orthogonal to the X-axis direction. A plane defined by the X-axis direction and the Y-axis direction is substantially horizontal.

Figure 1:
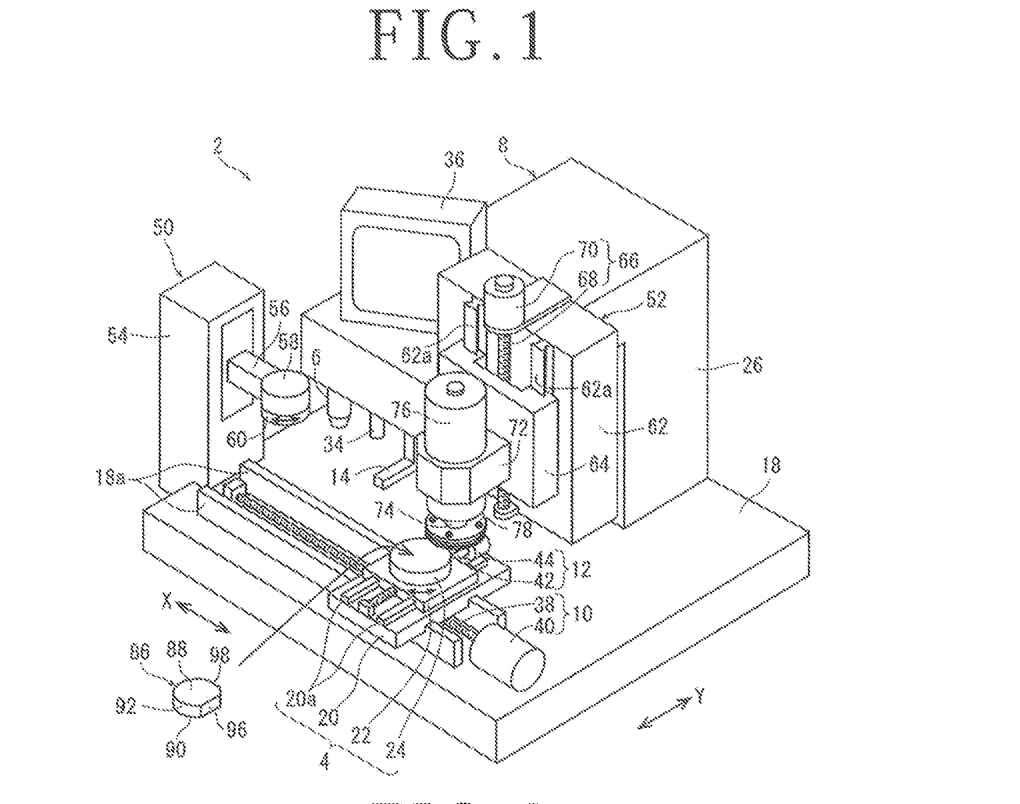
FIG. 1 is a perspective view of a laser processing apparatus according to an embodiment of the present invention.

As depicted in FIG. 1, the holding unit 4 includes an X-axis movable plate 20 mounted on a base 18 so as to be movable in the X-axis direction, a Y-axis movable plate 22 mounted on the X-axis movable plate 20 so as to be movable in the Y-axis direction, a circular holding table 24 rotatably mounted on an upper surface of the Y-axis movable plate 22, and a holding table motor (not illustrated) that rotates the holding table 24.

Figure 2:
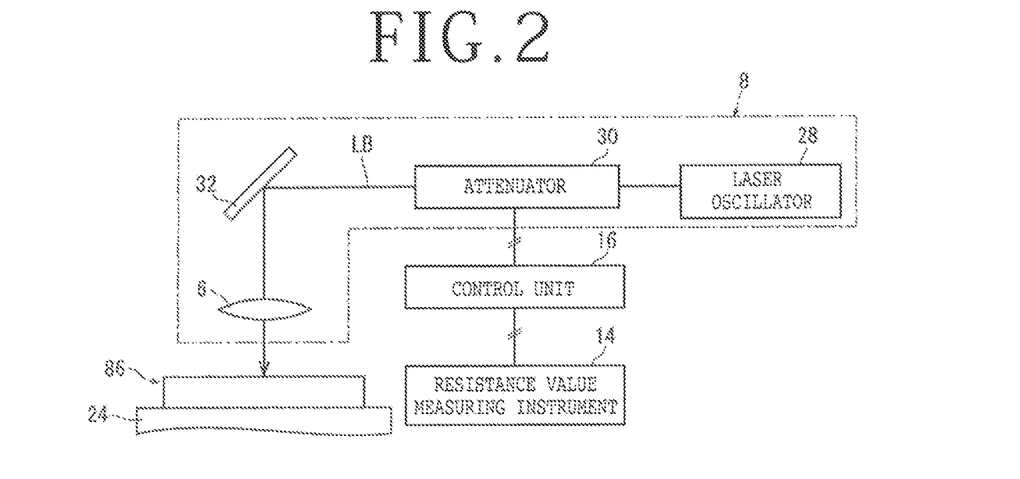
FIG. 2 is a block diagram depicting a part of the configuration of the laser processing apparatus illustrated in FIG. 1.

The laser beam applying unit 8 includes a housing 26 that extends upward from an upper surface of the base 18 and then extends substantially horizontally. As depicted in FIG. 2, a laser oscillator 28 that oscillates a pulsed laser of such a wavelength as to be transmitted through the SiC ingot, an attenuator 30 that adjusts the output of a pulsed laser beam LB emitted from the laser oscillator 28, and a mirror 32 that reflects the pulsed laser beam LB adjusted in output by the attenuator 30 to guide the pulsed laser beam LB to the light condenser 6, are incorporated in the housing 26.

As illustrated in FIG. 1, the light condenser 6 of the laser beam applying unit 8 is mounted to a lower surface of a tip end of the housing 26. In addition, the laser beam applying unit 8 includes a focal point position adjusting mechanism (not illustrated). It is sufficient that the focal point position adjusting mechanism includes, for example, a ball screw connected to the light condenser 6 and extending in the vertical direction and a motor that rotates the ball screw, and is configured to adjust the position in the vertical direction of the focal point of the pulsed laser beam LB emitted from the laser oscillator 28.

In the case where a c-plane is inclined relative to the end face of the SiC ingot held by the holding unit 4 and in the case where a direction orthogonal to a direction in which an off angle is formed between the end face of the SiC ingot and the c-plane is set as the X-axis direction while a direction orthogonal to the X-axis direction is set as the Y-axis direction, the light condenser 6 is configured to apply a pulsed laser beam LB of such a wavelength as to be transmitted through the SiC ingot to the SiC ingot with a focal point of the pulsed laser beam LB positioned at a depth corresponding to the thickness of a wafer to be formed.

As depicted in FIG. 1, an imaging unit 34 that images the SiC ingot held by the holding unit 4 is mounted to a lower surface of a tip end of the housing 26 at a position spaced from the light condenser 6 in the X-axis direction. In addition, a display unit 36 that displays an image captured by the imaging unit 34 is disposed on an upper surface of the housing 26.

The X-axis feeding mechanism 10 has a ball screw 38 extending in the X-axis direction along the upper surface of the base 18 and a motor 40 that rotates the ball screw 38. A nut section (not illustrated) of the ball screw 38 is connected to the X-axis movable plate 20. The X-axis feeding mechanism 10 converts a rotational motion of the motor 40 into a rectilinear motion and transmits the rectilinear motion to the X-axis movable plate 20 by the ball screw 38, to thereby put the X-axis movable plate 20 into processing feeding in the X-axis direction relative to the light condenser 6 along guide rails 18a on the base 18.

The Y-axis feeding mechanism 12 has a ball screw 42 extending in the Y-axis direction along an upper surface of the X-axis movable plate 20 and a motor 44 that rotates the ball screw 42. A nut section (not illustrated) of the ball screw 42 is connected to the Y-axis movable plate 22. The Y-axis feeding mechanism 12 converts a rotational motion of the motor 44 into a rectilinear motion and transmits the rectilinear motion to the Y-axis movable plate 22 by the ball screw 42, to thereby put the Y-axis movable plate 22 into indexing feeding in the Y-axis direction relative to the light condenser 6 along guide rails 20a on the X-axis movable plate 20.

As illustrated in FIG. 1, the resistance value measuring instrument 14 is mounted to the lower surface of the tip end of the housing 26 at a position spaced from the imaging unit 34 in the X-axis direction. As the resistance value measuring instrument 14, a non-contact type or contact type known resistance measuring instrument (for example, "CE-80P-PN eddy current resistance measuring instrument (non-contact type)" sold by NAPSON CORPORATION) may be used. The value measured by the resistance value measuring instrument 14 may be electric resistance (mΩ) or electrical resistivity (mΩ·cm). Note that, in the case where the resistance value measuring instrument 14 is of the contact type, a lifting unit for lifting the resistance value measuring instrument 14 upward and downward is added to the housing 26.

The control unit 16 including a computer includes a central processing unit (CPU) that performs arithmetic processing according to a control program, a read only memory (ROM) that stores the control program and the like, and a readable/writable random access memory (RAM) that stores the results of arithmetic processing and the like, which are not illustrated. In the read only memory of the control unit 16, a relation between the electrical resistivity of the SiC ingot and the pulse energy of the laser beam for forming a proper peeling belt in the SiC ingot as depicted in FIG. 3 is preliminarily stored, for example.

Figure 3:
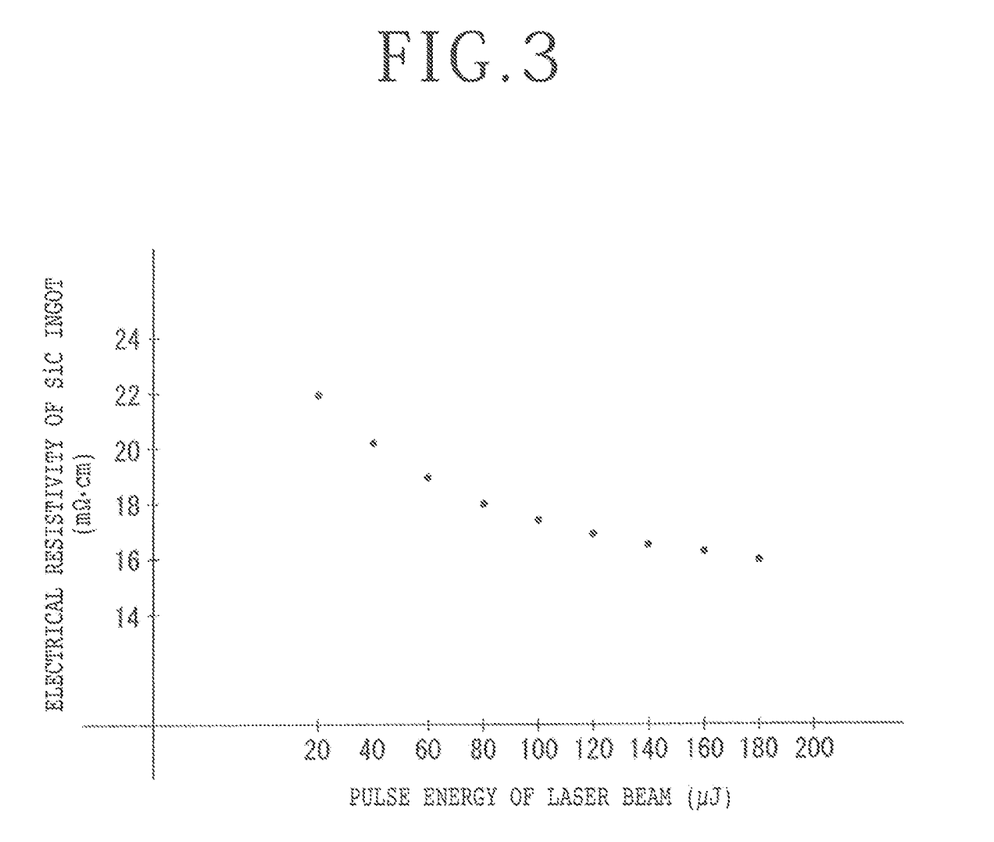
FIG. 3 is a graph depicting the relation between the electrical resistivity of a SiC ingot and the pulse energy of a laser beam, for forming a proper peeling belt in the SiC ingot.

Regarding the relation depicted in FIG. 3, for example, in the case where the electrical resistivity of the end face of the SiC ingot is 22 mΩ·cm, a proper peeling belt is formed in the SiC ingot when the pulse energy of the laser beam applied to the SiC ingot is 20 μJ. However, when the pulse energy is smaller than 20 μJ in the case where the electrical resistivity is 22 mΩ·cm, the cracks in the peeling belt do not grow sufficiently, and the wafer may not reliably be peeled off from the SiC ingot suitably. On the other hand, when the pulse energy is greater than 20 μJ in the case where the electrical resistivity is 22 mΩ·cm, although the wafer can suitably be peeled off from the SiC ingot with the peeling belt as a start point, the cracks in the peeling belt grow more than necessary, and the grinding amounts at the time of grinding the peeling surface of the SiC ingot and the peeling surface of the wafer into a flat state after peeling the wafer off from the SiC ingot would increase, resulting in an increase of material loss.

The relation between the electrical resistivity of the SiC ingot and the pulse energy of the laser beam for forming a proper peeling belt in the SiC ingot as depicted in FIG. 3 is set as required based on, for example, the results of an experiment preliminarily carried out, as a relation with which the wafer can be suitably peeled off from the SiC ingot with the peeling belt as a start point and the material loss is comparatively small.

As illustrated in FIG. 2, the control unit 16 is electrically connected to the resistance value measuring instrument 14, and a signal concerning the electric resistance value measured by the resistance value measuring instrument 14 is sent from the resistance value measuring instrument 14 to the control unit 16. In addition, the control unit 16 is also electrically connected to the attenuator 30 of the laser beam applying unit 8. The control unit 16 controls the attenuator 30 according to the electric resistance value sent from the resistance value measuring instrument 14, thereby to adjust the output of the pulsed laser beam LB such that a proper peeling belt can be formed in the SiC ingot.

As depicted in FIG. 1, the laser processing apparatus 2 of the present embodiment further includes a peeling unit 50 that peels the wafer off from the SiC ingot with the peeling belt as a start point, and a grinding unit 52 that grinds the end face of the SiC ingot to form a flat surface.

The peeling unit 50 includes a casing 54 disposed at a terminal end portion of the guide rails 18a on the base 18, an arm 56 extending in the X-axis direction from a base end supported by the casing 54 in the manner of being liftable upward and downward, and an arm lifting unit (not illustrated) that lifts the arm 56 upward and downward. It is sufficient that the arm lifting unit includes a ball screw connected to the arm 56 and extending in the vertical direction and a motor that rotates the ball screw. A motor 58 is additionally provided at a tip end of the arm 56, and a suction piece 60 is connected to a lower surface of the motor 58 in the manner of being rotatable around an axis extending in the vertical direction. The suction piece 60 is formed in its lower surface with a plurality of suction holes (not illustrated), and the suction piece 60 is connected to suction means (not illustrated). In addition, ultrasonic vibration applying means (not illustrated) for applying ultrasonic vibration to the lower surface of the suction piece 60 is incorporated in the suction piece 60.

The grinding unit 52 includes a mount wall 62 connected to the housing 26, a lift plate 64 mounted to a one-side surface of the mount wall 62 so as to be liftable upward and downward, and a lifting unit 66 that lifts the lift plate 64 upward and downward. The lifting unit 66 includes a ball screw 68 extending in the vertical direction along the one-side surface of the mount wall 62 and a motor 70 that rotates the ball screw 68. A nut section (not illustrated) of the ball screw 68 is connected to the lift plate 64. In the lifting unit 66, a rotational motion of the motor 70 is converted into a rectilinear motion, and the rectilinear motion is transmitted to the lift plate 64 by the ball screw 68, so that the lift plate 64 is lifted upward and downward along guide rails 62a additionally provided on the one-side surface of the mount wall 62.

Figure 5:
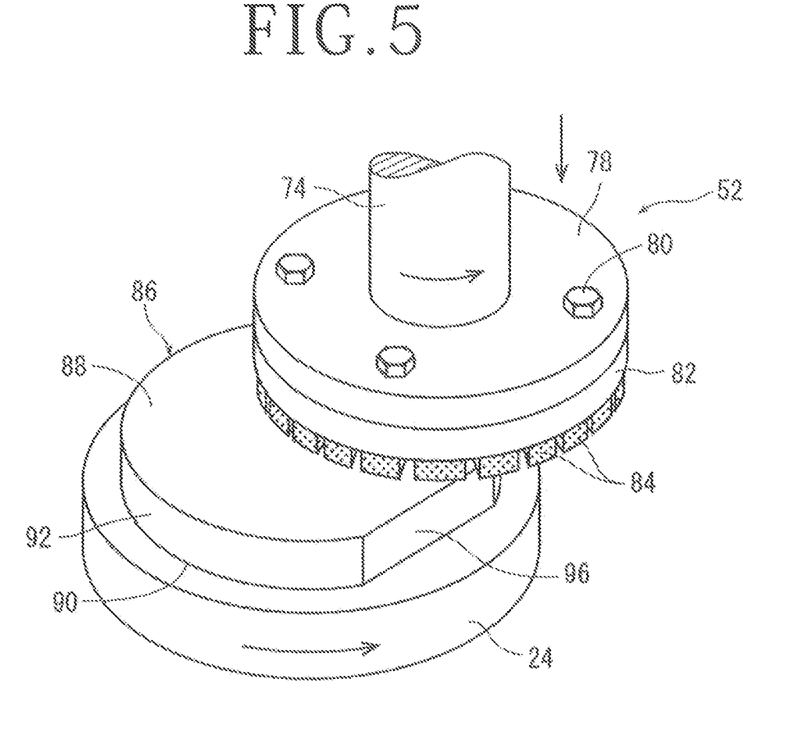
FIG. 5 is a perspective view depicting a state in which a flat surface forming step is being carried out.

A support wall 72 projecting in the Y-axis direction is fixed to a one-side surface of the lift plate 64. A spindle 74 is supported on the support wall 72 so as to be rotatable around an axis extending in the vertical direction, and a spindle motor 76 that rotates the spindle 74 is mounted on an upper surface of the support wall 72. Referring to FIG. 5 together with FIG. 1, a disk-shaped wheel mount 78 is fixed to a lower end of the spindle 74, and an annular grinding wheel 82 is fixed to a lower surface of the wheel mount 78 by bolts 80. A plurality of grindstones 84 arranged in an annular pattern at intervals in the circumferential direction are fixed to an outer peripheral edge portion of a lower surface of the grinding wheel 82.

Figure 4A:
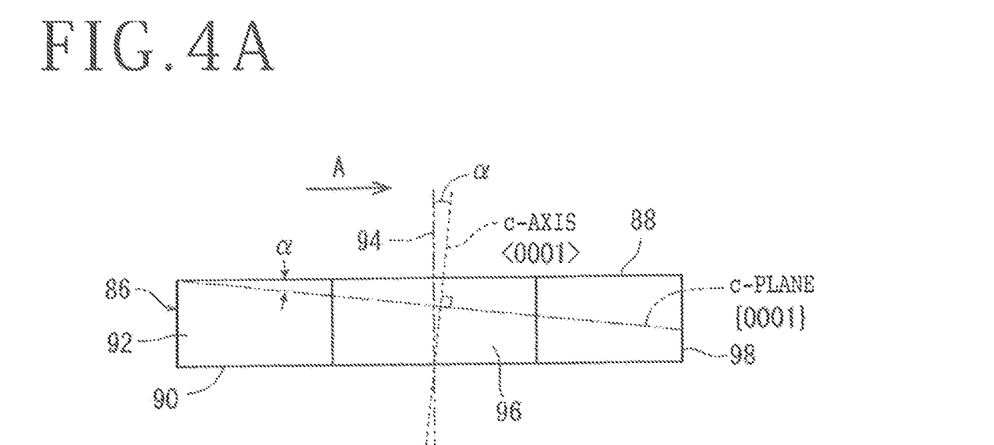
FIG. 4A is a front view of the SiC ingot.

FIG. 4A depicts a cylindrical SiC ingot 86 formed of SiC. The SiC ingot 86 has a circular first end face 88, a circular second end face 90 on the side opposite to the first end face 88, a circumferential surface 92 located between the first end face 88 and the second end face 90, a c-axis (<0001> direction) extending from the first end face 88 to the second end face 90, and a c-plane ({0001} plane) orthogonal to the c-axis.

Figure 4B:
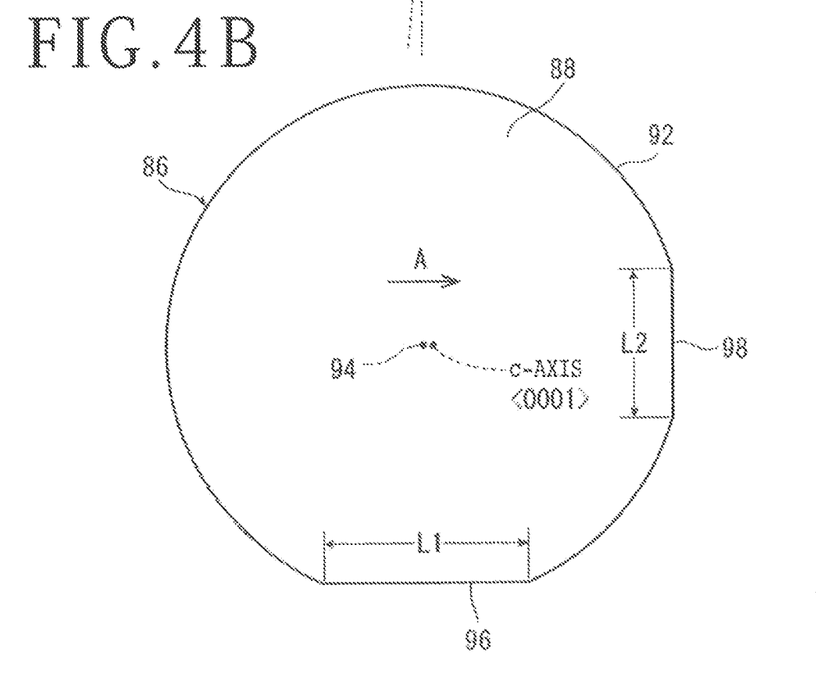
FIG. 4B is a plan view of the SiC ingot.

In the SiC ingot 86, the c-plane is inclined relative to the first end face 88 (the c-axis is inclined to a perpendicular 94 of the first end face 88), and an off angle α (for example, α=1, 3, or 6 degrees) is formed between the first end face 88 and the c-plane. The direction in which the off angle α is formed is indicated by an arrow A in FIGS. 4A and 4B. In addition, the circumferential surface 92 of the SiC ingot 86 is formed with a first orientation flat 96 and a second orientation flat 98 which are both rectangular and indicate the crystal orientation. The first orientation flat 96 is parallel to a direction A in which the off angle α is formed, and the second orientation flat 98 is orthogonal to the direction A in which the off angle α is formed. As depicted in FIG. 4B, as viewed from above, a length L2 of the second orientation flat 98 is shorter than a length L1 of the first orientation flat 96 (L2<L1).

Next, a preferred embodiment of the SiC ingot processing method of the present invention will be described. Here, the SiC ingot processing method using the abovementioned laser processing apparatus 2 will be described. In the SiC ingot processing method in the present embodiment, first, with the second end face 90 directed downward, the SiC ingot 86 is fixed to an upper surface of the holding table 24 through an adhesive (for example, an epoxy resin adhesive) as required. Note that the upper surface of the holding table 24 may be formed with a plurality of suction holes and that the SiC ingot 86 may be held under suction by generating a suction force at the upper surface of the holding table 24.

After the SiC ingot 86 is fixed onto the holding table 24, a flat surface forming step of grinding an end face of the SiC ingot 86 to form a flat surface is carried out, unless the end face of the SiC ingot 86 is preliminarily formed to be flat.

In the flat surface forming step, first, the holding table 24 is positioned under the grinding wheel 82 of the grinding unit 52 by the X-axis feeding mechanism 10. Next, as depicted in FIG. 5, the holding table 24 is rotated by the holding table motor at a predetermined rotational speed (for example, 300 rpm) counterclockwise as viewed from above. In addition, the spindle 74 is rotated by the spindle motor 76 at a predetermined rotational speed (for example, 6,000 rpm) counterclockwise as viewed from above. Subsequently, the spindle 74 is lowered by the lifting unit 66 to bring the grindstones 84 into contact with the first end face 88 of the SiC ingot 86. Thereafter, the spindle 74 is lowered at a predetermined grinding feeding speed (for example, 0.1 μm/s). As a result, the first end face 88 of the SiC ingot 86 can be ground to form a flat surface of such an extent as not to hinder the incidence of a laser beam.

Figure 6:
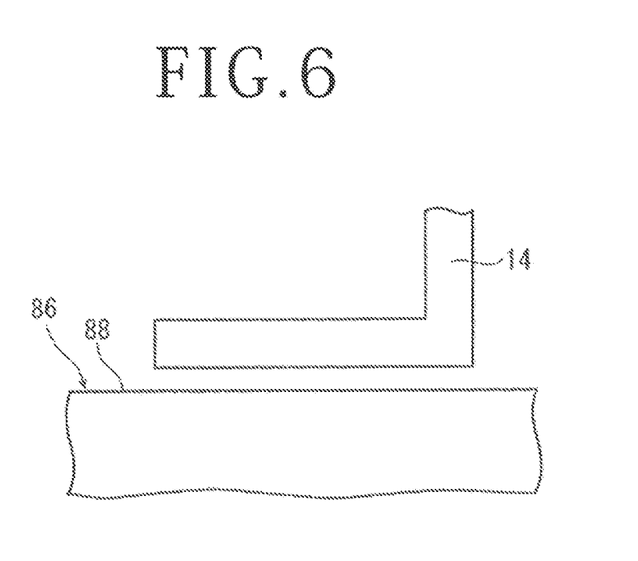
FIG. 6 is a front view depicting a state in which a resistance value measuring step is being carried out.

After the flat surface forming step is performed, a resistance value measuring step of measuring the electric resistance value of the first end face 88 of the SiC ingot 86 is carried out. In the resistance value measuring step, first, the holding table 24 is positioned under the resistance value measuring instrument 14 by the X-axis feeding mechanism 10, and the first end face 88 of the SiC ingot 86 is made to face the resistance value measuring instrument 14, as illustrated in FIG. 6. Next, the electric resistance value of the first end face 88 of the SiC ingot 86 is measured by the resistance value measuring instrument 14. Then, a signal concerning the electric resistance value measured by the resistance value measuring instrument 14 is sent to the control unit 16. Note that, in the case where the resistance value measuring instrument 14 is of the contact type, after the first end face 88 of the SiC ingot 86 is made to face the resistance value measuring instrument 14, the resistance value measuring instrument 14 is lowered by the lifting unit to bring a measurement probe (not illustrated) of the resistance value measuring instrument 14 into contact with the first end face 88 of the SiC ingot 86, and the electric resistance value of the first end face 88 of the SiC ingot 86 is measured.

After the resistance value measuring step is performed, a laser beam output adjusting step of adjusting the output of the laser beam according to the electric resistance value measured in the resistance value measuring step is carried out. In the laser beam output adjusting step, based on the relation (for example, the relation depicted in FIG. 3) between the electric resistance value of the SiC ingot 86 and the pulse energy of the laser beam LB, the attenuator 30 of the laser beam applying unit 8 is controlled by the control unit 16 according to the electric resistance value sent from the resistance value measuring instrument 14, to thereby adjust the output of the pulsed laser beam LB to be applied to the SiC ingot 86.

After the laser beam output adjusting step is performed, in the case where the c-plane is inclined relative to the end face of the SiC ingot 86 and in the case where the direction orthogonal to the direction A in which the off angle α is formed between the end face of the SiC ingot 86 and the c-plane is set as the X-axis direction while the direction orthogonal to the X-axis direction is set as the Y-axis direction, a peeling belt forming step is carried out in which, while a pulsed laser beam LB of such a wavelength as to be transmitted through the SiC ingot 86 is being applied to the SiC ingot 86 with the focal point of the pulsed laser beam LB positioned at a depth corresponding to the thickness of a wafer to be formed, the SiC ingot 86 and the focal point are put into relative processing feeding in the X-axis direction to form a belt-shaped peeling belt in which a crack extends along the c-plane from a part where SiC is separated into Si and C.

Figure 7A:
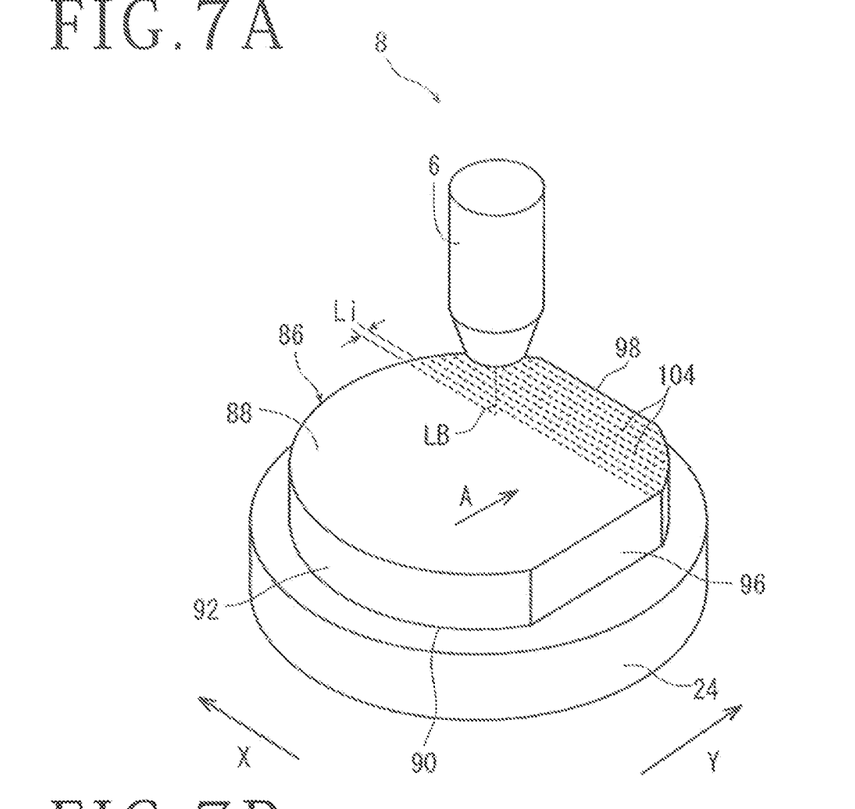
FIG. 7A is a perspective view depicting a state in which a peeling belt forming step is being carried out.

In the peeling belt forming step, first, the SiC ingot 86 is imaged by the imaging unit 34 from above the SiC ingot 86. Next, based on the image of the SiC ingot 86 captured by the imaging unit 34, the holding table 24 is moved and rotated by the X-axis feeding mechanism 10, the Y-axis feeding mechanism 12, and the holding table motor such that the orientation of the SiC ingot 86 is adjusted to a predetermined orientation and such that the positions of the SiC ingot 86 and the light condenser 6 on an XY plane are adjusted. At the time of adjusting the orientation of the SiC ingot 86 to the predetermined orientation, as depicted in FIG. 7A, the second orientation flat 98 is matched to the X-axis direction, so that the direction orthogonal to the direction A in which the off angle α is formed and the X-axis direction are matched to each other, and the direction A in which the off angle α is formed and the Y-axis direction are matched to each other.

Figure 7B:
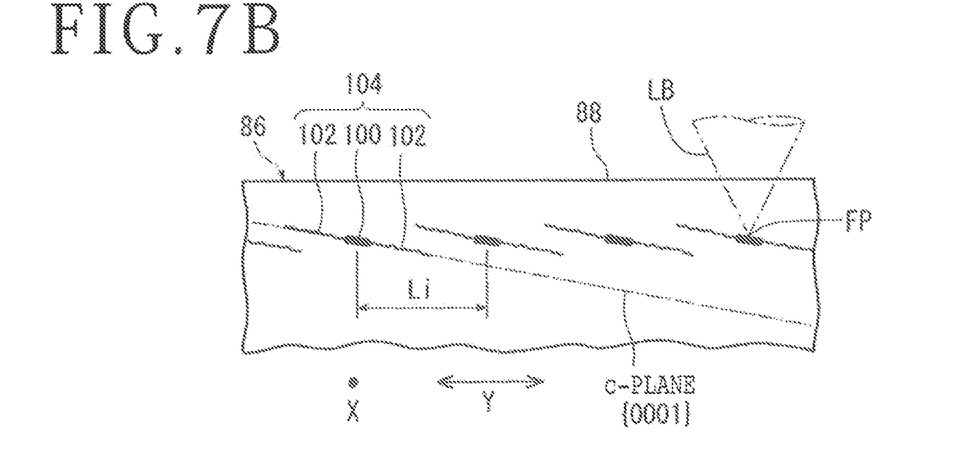
FIG. 7B is a sectional view depicting a state in which the peeling belt forming step is being carried out.

Next, the light condenser 6 is lifted upward and downward by the focal point position adjusting mechanism such that a focal point FP (see FIG. 7B) of the pulsed laser beam LB is positioned at a depth corresponding to the thickness of the wafer to be formed, from the first end face 88 of the SiC ingot 86. Subsequently, while the holding table 24 is put into processing feeding in the X-axis direction, which is matched to the direction orthogonal to the direction A in which the off angle α is formed, at a predetermined processing feeding speed by the X-axis feeding mechanism 10, a pulsed laser beam LB of such a wavelength as to be transmitted through the SiC ingot 86 is applied from the light condenser 6 to the SiC ingot 86. As a result, as depicted in FIG. 7B, SiC is separated into Si and C by application of the pulsed laser beam LB, and the pulsed laser beam LB applied next is absorbed in C formed previously, so that SiC is separated into Si and C in a chain reaction manner. In addition, a peeling belt 104 in which cracks 102 extend along the c-plane from a part 100 where SiC is separated into Si and C is formed in the X-axis direction.

Such a peeling belt forming step may be conducted, for example, under the following conditions. Note that the defocus described below is the moving amount when the light condenser 6 is moved toward the upper surface of the SiC ingot 86 from a state in which the focal point FP of the pulsed laser beam LB is positioned at the upper surface of the SiC ingot 86.

Electric resistance value of SiC ingot: 16 to 22 mΩ·cm
Pulse energy of laser beam: 20 to 180 μJ
Wavelength: 1,064 nm
Average output: 0.6 to 5.4 W
Repetition frequency: 30 kHz
Pulse width: 3 ns
Processing feeding speed: 165 mm/s
Defocus: 188 μm Position of peeling belt from upper surface of SiC ingot: 500 μm Next, an indexing feeding step is carried out in which the SiC ingot 86 and the focal point FP are put into relative indexing feeding in the Y-axis direction to juxtapose the peeling belts 104 in the Y-axis direction. In the indexing feeding step, the holding table 24 is moved by the Y-axis feeding mechanism 12 such that the SiC ingot 86 is put into indexing feeding relative to the focal point FP by a predetermined indexing feeding amount Li in the Y-axis direction matched to the direction A in which the off angle α is formed.

Then, the peeling belt forming step and the indexing feeding step described above are alternately repeated such that the peeling belts 104 extending in the X-axis direction are juxtaposed at intervals of the predetermined indexing feeding amount Li in the Y-axis direction, as depicted in FIG. 7B. Note that the indexing feeding amount Li is set within such a range as not to exceed the width of the cracks 102, and the cracks 102 in the peeling belts 104 adjacent to each other in the Y-axis direction are made to overlap with each other as viewed in the vertical direction, so that the peeling of the wafer in the peeling step described below is facilitated.

After the plurality of peeling belts 104 are formed inside the SiC ingot 86 (at a depth corresponding to the thickness of the wafer to be formed), a peeling step of peeling the wafer off from the SiC ingot 86 with the peeling belts 104 as start points is carried out.

Figure 8:
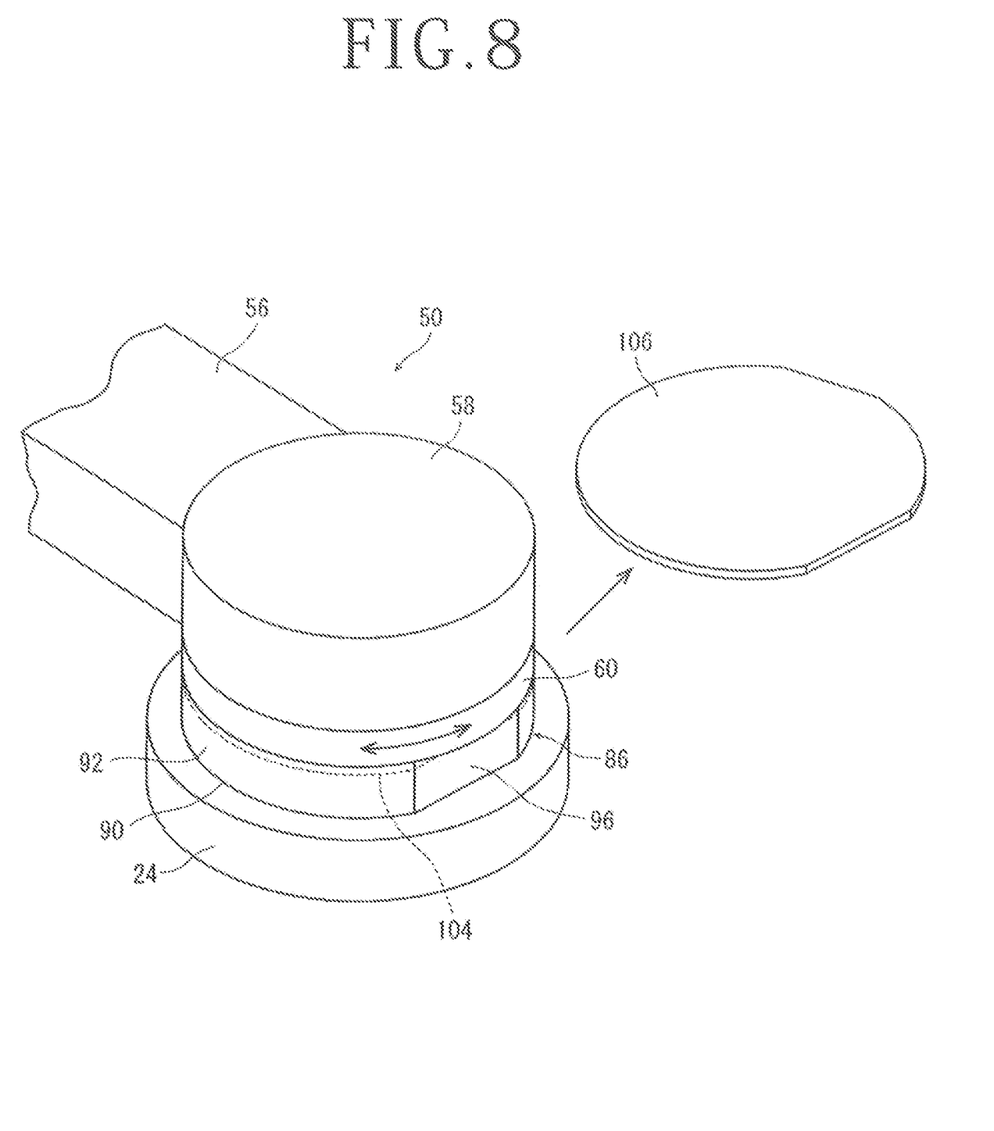
FIG. 8 is a perspective view depicting a state in which a peeling step is being carried out.

In the peeling step, first, the holding table 24 is positioned under the suction piece 60 of the peeling unit 50 by the X-axis feeding mechanism 10. Next, the arm 56 is lowered by the arm lifting unit to bring the lower surface of the suction piece 60 into close contact with the first end face 88 of the SiC ingot 86, as depicted in FIG. 8. Subsequently, the suction means is operated to suction attach the lower surface of the suction piece 60 to the first end face 88 of the SiC ingot 86. Next, the ultrasonic vibration applying means is operated to apply ultrasonic vibration to the lower surface of the suction piece 60, and the suction piece 60 is rotated by the motor 58. As a result, a wafer 106 can be peeled off with the peeling belts 104 as start points.

After the peeling step is performed, the flat surface forming step, the resistance value measuring step, the laser beam output adjusting step, the peeling belt forming step, the indexing feeding step, and the peeling step described above are repeated, so that a plurality of wafers 106 can be formed from the SiC ingot 86.

As described above, in the present embodiment, the electric resistance value of the end face of the SiC ingot 86 is measured, and the output of the pulsed laser beam LB is adjusted according to the measured electric resistance value, and, therefore, proper peeling belts 104 can be formed in the SiC ingot 86.

Note that, while an example in which the wafer 106 is formed from the SiC ingot 86 by forming the peeling belts 104 in the SiC ingot 86 has been described above, in the present invention, a peeling belt may be formed in the SiC wafer, and, for example, one sheet of SiC wafer of a thickness of approximately 1 mm may be divided into two sheets of SiC wafers of a thickness of approximately 0.5 mm. In this case, the one sheet of SiC wafer before division corresponds to the SiC in the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of processing a SiC ingot having an end face, the method comprising:
    a resistance value measuring step of measuring an electric resistance value of the end face of the SiC ingot;
    a laser beam output adjusting step of adjusting output of a laser beam according to the electric resistance value measured in the resistance value measuring step;
    a peeling belt forming step in which, in a case wherein a c-plane is inclined relative to the end face of the SiC ingot, an off angle is present between the end face of the SiC ingot and the c-plane, the off angle is parallel to an X-axis direction, and the X-axis direction is orthogonal to a Y-axis direction, while a laser beam of such a wavelength as to be transmitted through the SiC ingot is being applied to the SiC ingot with a focal point of the laser beam positioned at a depth corresponding to a thickness of a wafer to be formed, the SiC ingot and the focal point are put into relative processing feeding in the X-axis direction to form a belt-shaped peeling belt in which a crack extends along the c-plane from a part where SiC is separated into Si and C; and
    an indexing feeding step of putting the SiC ingot and the focal point into relative indexing feeding in the Y-axis direction to juxtapose the peeling belts in the Y-axis direction.

2. The method of processing a SiC ingot according to claim 1, further comprising:
    a flat surface forming step of grinding the end face of the SiC ingot to form a flat surface, before the peeling belt forming step.

3. A laser processing apparatus that forms a peeling belt in a SiC ingot, the laser processing apparatus comprising:
    a holding table that holds the SiC ingot;
    a laser beam applying unit that, in a case wherein a c-plane is inclined relative to an end face of the SiC ingot held by the holding table, an off angle is present, between the end face of the SiC ingot and the c-plane, the off angle is parallel to an X-axis direction and the X-axis direction is orthogonal to a Y-axis direction, includes a light condenser for applying a laser beam of such a wavelength as to be transmitted through the SiC ingot to the SiC ingot with a focal point of the laser beam positioned at a depth corresponding to a thickness of a wafer to be formed and forms a belt-shaped peeling belt in which a crack extends along the c-plane from a part where SiC is separated into Si and C;
    an X-axis feeding mechanism that puts the holding table and the light condenser into relative processing feeding in the X-axis direction;
    a Y-axis feeding mechanism that puts the holding table and the light condenser into relative indexing feeding in the Y-axis direction;
    a resistance value measuring instrument that measures an electric resistance value of the end face of the SiC ingot; and
    a control unit that adjusts output of the laser beam according to the electric resistance value measured by the resistance value measuring instrument.

* * * * *